US012601580B2

(12) United States Patent
Zhong et al.

(10) Patent No.: US 12,601,580 B2
(45) Date of Patent: Apr. 14, 2026

(54) ADDITIVE MANUFACTURED ASSEMBLY-FREE TOOL FOR MAINTENANCE OF VEHICLE ENGINE

(71) Applicant: VOLVO TRUCK CORPORATION, Gothenburg (SE)

(72) Inventors: Yuan Zhong, Danderyd (SE); Lennart Olausson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 422 days.

(21) Appl. No.: 18/295,348

(22) Filed: Apr. 4, 2023

(65) Prior Publication Data

US 2023/0324160 A1 Oct. 12, 2023

(30) Foreign Application Priority Data

Apr. 4, 2022 (EP) ..................................... 22166482

(51) Int. Cl.
| | |
|---|---|
| *B33Y 80/00* | (2015.01) |
| *B22F 10/28* | (2021.01) |
| *G01B 3/28* | (2006.01) |
| *G01B 5/00* | (2006.01) |
| *G01B 5/14* | (2006.01) |
| *B22F 5/00* | (2006.01) |
| *B33Y 10/00* | (2015.01) |

(52) U.S. Cl.
CPC .............. *G01B 5/003* (2013.01); *B22F 10/28* (2021.01); *B33Y 80/00* (2014.12); *G01B 5/14* (2013.01); *B22F 2005/002* (2013.01); *B33Y 10/00* (2014.12)

(58) Field of Classification Search
CPC .......... G01B 5/003; G01B 5/14; B33Y 10/00; B33Y 80/00; B22F 10/28; B22F 2005/002
USPC .......................................................... 33/600
See application file for complete search history.

(56) References Cited

U.S. PATENT DOCUMENTS

| | | | | |
|---|---|---|---|---|
| 9,255,778 B2 * | 2/2016 | Wada | ........................ | G01B 3/26 |
| 2020/0333089 A1 * | 10/2020 | Sailler | ................... | F28D 9/0062 |

(Continued)

FOREIGN PATENT DOCUMENTS

| | | | | |
|---|---|---|---|---|
| EP | 4257916 B1 * | 7/2024 | ............... | G01B 5/14 |
| WO | WO-2019113622 A1 * | 6/2019 | ............... | G01B 3/28 |

OTHER PUBLICATIONS

Extended European Search Report in corresponding European Application No. 22166482.4 dated Oct. 25, 2022 (9 pages).

(Continued)

*Primary Examiner* — Peter J Macchiarolo
*Assistant Examiner* — Anna Josephine Saunders
(74) *Attorney, Agent, or Firm* — Jeffri A. Kaminski; Venable LLP

(57) ABSTRACT

An assembly-free tool for maintenance of an engine in a vehicle is described. The tool comprises a bar extending in an axial direction and having a first portion with a first end and a second portion with a second end and a housing surrounding the first portion of the bar. The bar is axially translatable in relation to the housing. The housing comprises an embedded locking structure for holding the bar in a locking position to stop the movement of the bar in the axial direction. The bar, the housing and the locking structure are retained as one unit such that they are non-detachable from each other.

14 Claims, 5 Drawing Sheets

(56) References Cited

U.S. PATENT DOCUMENTS

2022/0080522 A1* 3/2022 Cox .................. B23K 20/1265
2023/0324160 A1* 10/2023 Zhong ...................... G01B 3/28
33/600

OTHER PUBLICATIONS

"Special Bulletin" SP12-01A; Volvo D13 Engine EPA2010—
Double Idler Gear Repair; Prevost vehicles; SB-10044284-2627;
Jun. 22, 2011; XP055969914; Retrieved from the Internet: URL:https://
static.nhtsa.gov/odi/tsbs/2012/SB-10044284-2627.pdf; pp. 1-25 (25
pages).
"ServiceBulletin Mack Trucks Trucks—JustAnswer— . . . ww2.
justanswer.com/uploads/HE/ HeavyEquipmentTech/2013-12 . . .
Dec. 9, 2013"; Service Bulletin; Camshaft Sensor, Replacement;
Mack Trucks, Inc., Greensboro, NC, USA; Apr. 1, 2010; URL:
<https://fdocuments.net/document/servicebulletin-mack-trucks-trucks-
justanswer-ww2-mack-trucks-inc-greensboroncusa.html>; 5 pages.

* cited by examiner (a)

(b)

215

237

238

235

500

510. Printing whole tool using 3D-printing machine on building plate

520. Separating whole tool as one unit from building plate

ADDITIVE MANUFACTURED ASSEMBLY-FREE TOOL FOR MAINTENANCE OF VEHICLE ENGINE

TECHNICAL FIELD

The disclosure relates to an additive manufactured assembly-free tool for maintenance of an engine in a vehicle.

BACKGROUND

FIG. 1(a) shows a special setting tool 10 with a series number 88800031 which is used in maintenance of engines in heavy duty trucks, e.g. when checking for proper camshaft position sensor clearance to determine if shims are required for sensor depth. The special setting tool 10 is used to measure the distance between two components, e.g. a tooth of a camshaft toothed wheel and a timing gear cover, in an engine. As shown in FIG. 1(b), (c), (d), the distance or gap between the two components is indicated by edges shown outside one end of the tool 10. Based on the measured result, different layers of shims will be added accordingly in the following maintenance step. For example, if no edge is shown outside the tool 10, as indicated in FIG. 1(b), then no shim will be added. If one edge is shown outside the tool 10, as indicated in FIG. 1(c), then one piece shim will be added. If two edges are shown outside the tool 10, as indicated in FIG. 1(d), then two pieces shim will be added.

FIG. 1(e) shows a cross-section view of the original setting tool 10. The original setting tool 10 has four parts, a first part 11: an outer housing; a second part 12: an inner part; a third part 13: a spring pin; a fourth part 14: a screw. After the four parts are manufactured separately, the assembly process is firstly, inserting the second part 12 into the first part 11, secondly, inserting the third part 13 through the holes in the first 11 and second parts 12, then screwing in the fourth part 14. The spring pin 13 is to hold the second part 12 so that it is not falling off from the first part 11. The spring pin 13 is made of spring steel and is very small and easy to be lost. The original setting tool 10 is using the force of the screw 14 to secure the position of the inner part 12. There is a possibility of slippery during operation and also a wear problem on the inner part 12.

SUMMARY

An object of the disclosure is to provide a setting tool for maintenance of an engine in a vehicle with improved performance and simplified usage.

According to a first aspect of embodiments herein, the tool comprises a bar extending in an axial direction and having a first portion with a first end and a second portion with a second end. The tool further comprises a housing surrounding the first portion of the bar. The bar is axially translatable in relation to the housing. The housing comprises an embedded locking structure for holding the bar in a locking position such that the movement of the bar in the axial direction is stopped. The bar, the housing and the locking structure are retained as one unit such that they are non-detachable from each other.

By the provision of the bar, the housing and the locking structure as one unit, the tool according to embodiments herein consolidates four parts of the original tool into one unit and can use the same type of steel material for the whole tool instead of using different steel material which will simplify the manufacturing process. That is the tool according to embodiments herein is self-assembled and consolidated without using the small spring pin, which will make the maintainability of the tool better and the usage of the tool simpler compared to the original tool.

According to some embodiments herein, the embedded locking structure may comprise a chamber and a lock element. The chamber is adapted to hold the lock element in an unlocking position and a locking position. The lock element is axially displaceable and rotatable within the chamber between the unlocking position and locking position. The lock element may be a pin with a protrusion bar i.e., a 'rotate-locking' pin or a screw.

According to some embodiments herein, the bar may comprise a jagged structure adjacent to the first end of the bar. The jagged structure is adapted to encounter the tip of the lock element when the lock element is in the locking position.

By the provision of the jagged structure and combined with the 'rotate-locking' pin to secure the position of the bar, the functionality, maintainability and the lifetime of the tool are expected to be improved.

According to some embodiments herein, the bar may comprise a retaining structure at the first portion of the bar for retaining the bar in the housing such that the bar and housing are non-detachable from each other.

According to some embodiments herein, the bar may comprise two or more markers at a position of the first portion of the bar spaced apart from the first end of the bar. The markers are for indicting measured distance.

The tool according to embodiments herein is configured to be manufactured by 3D-printing as one unit during a single additive manufacturing process.

According to some embodiments herein, the tool may be made of stainless steel, tool steel or titanium alloy.

According to some embodiments herein, any one or all of the bar the housing and the lock element may have a hollow structure with or without strengthening ribs.

By the provision of lightweight design, i.e. hollow structure with or without strengthening ribs for the tool, the weight of the tool, the material usage and corresponding cost for 3D printing the tool are reduced compared to the original tool.

According to a second aspect of embodiments herein, the method comprises printing the whole tool by using a 3D-printing machine on a building plate starting from the first end of the bar, a first end of the housing, a first end of the embedded locking structure and continuing up to the second end of the bar. The bar, the housing and the embedded locking structure are 3D-printed as one unit during a single manufacturing process. The method further comprises separating the whole tool as one unit from the building plate.

According to some embodiments herein, the optional retaining structure and jagged structure, the optional markers, the embedded locking structure with the pin and protrusion bar and the chamber with two surfaces, or the embedded locking structure with the chamber with threads and the screw are directly 3D-printed during the same single manufacturing process, such that the whole tool is 3D-printed as one unit during the single manufacturing process.

By manufacturing the whole tool as one unit and printing directly all internal structures using 3D-printing machine during one single manufacturing process, manufacturing different parts and assembly of all parts together are avoided. The tool needs neither manufacturing different parts nor using different materials as the case of the original tool. The tool is designed in a way that it can be metal 3D-printed without support structures and thus it can be used directly after printing without additional machining steps. The manufacturing process for the tool is therefore simplified compared to that of the original tool and a decrease in price can be expected. Further, the tool is self-assembled and does not need assembly process before usage. That is the tool according to embodiments herein is an assembly-free tool which makes it easy to use and operate, the service maintenance time is therefore shortened, and maintainability of the tool is improved.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

In the drawings.

DETAILED DESCRIPTION

Figure 1:
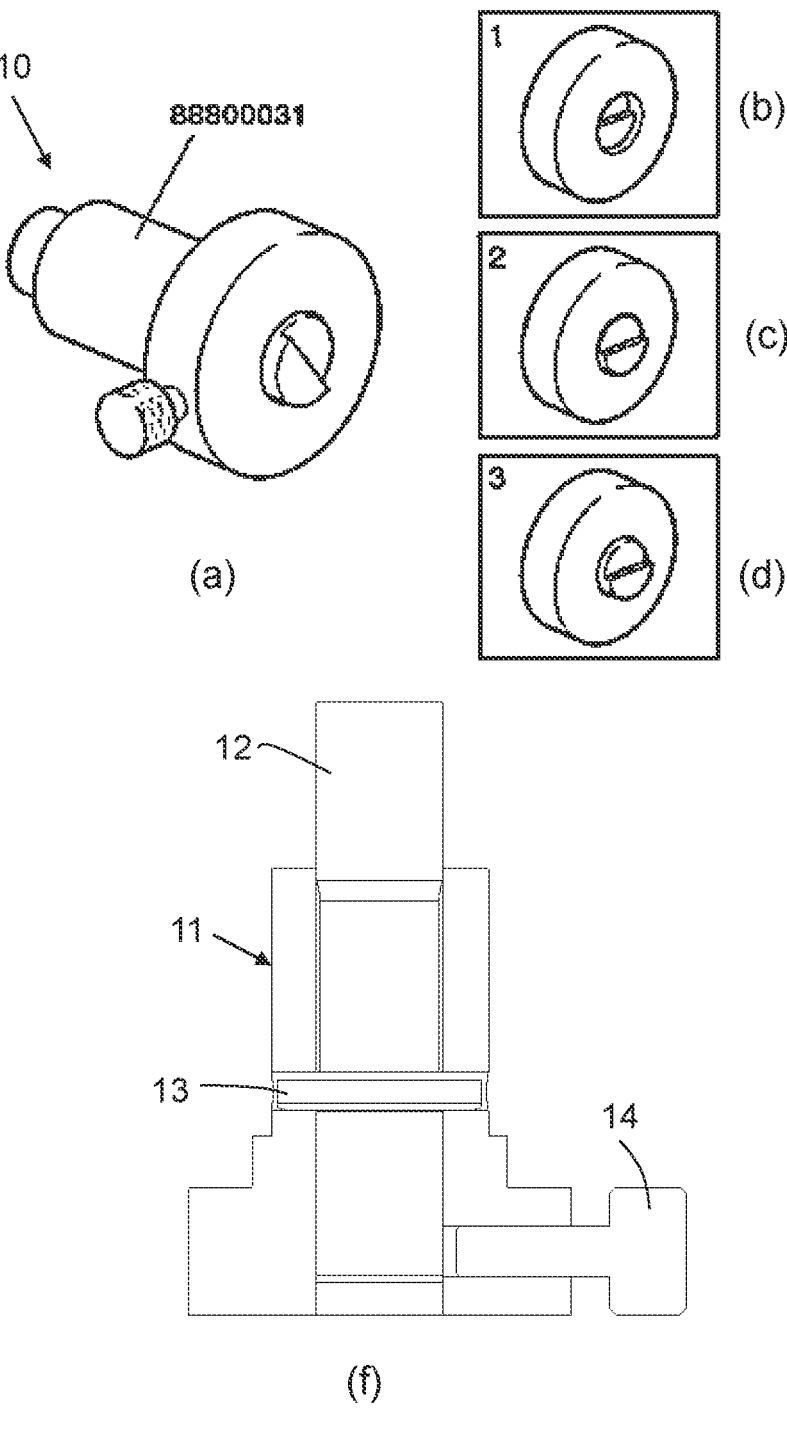
FIG. 1 shows an original setting tool.

To simplify the usage and manufacturing process of the tool 10, an assembly-free tool for maintenance of an engine in a vehicle, e.g. measuring distance between two components in the engine of the vehicle, is provided according to embodiments herein.

Three dimensions (3D) printing or additive manufacturing (AM) is a construction of a three-dimensional object from a computer-aided design (CAD) model or a digital 3D model. 3D-printing or AM can be used for producing everything, such as spare parts, prototypes etc. Products are manufactured layer by layer and are close to their final shape, thereby reducing wastage. Materials such as metals, polymers, wood flour, biocompatible materials, sand and composites are used at present. 3D-printing or AM paves a way for manufacturing on demand for many industries. Embodiments herein take the advantages of the 3D-printing or AM and provide an assembly-free tool for maintenance of an engine in a vehicle. The assembly-free tool according to embodiments herein consolidates four parts of the original tool 10 into one unit and can be additive manufactured by a single manufacturing process. The assembly-free tool according to embodiments herein can use the same type of steel material for the whole tool instead of using different steel materials which will simplify the manufacturing process.

The tool according to embodiments herein is an assembly-free tool which makes it easy to use and operate, the service maintenance time for an engine is therefore shortened, and maintainability of the tool is improved.

The assembly-free tool according to embodiments herein can be applied in maintenance of engines in heavy-duty vehicles, such as trucks. Although the disclosure will be described with respect to an engine in a heavy duty truck, the disclosure is not restricted to this particular engine, but may also be used in other engines of vehicles such as buses and medium duty vehicles etc.

FIG. 2(a) shows a perspective view of an assembly-free tool 200 according to embodiments herein for maintenance of an engine in a vehicle. FIG. 2(b) shows a cross-section view of the tool 200.

The tool 200 comprises a bar 210 extending in an axial A direction and having a first portion 211 with a first end 212 and a second portion 213 with a second end 214. The tool 200 further comprise a housing 220 surrounding the first portion 211 of the bar 210. The bar 210 is axially translatable in relation to the housing 220. The housing 220 comprises an embedded locking structure 230 for holding the bar 210 in a locking position to stop the movement of the bar 210 in the axial A direction. The bar 210, the housing 220 and the locking structure 230 are retained as one unit such that they are non-detachable from each other.

The housing 220 may have any kind of shape. To have the same functionality as the original setting tool, the size and shape of the housing 220 are the same as the outer housing of the original setting tool.

According to some embodiments herein, the embedded locking structure 230 may comprise a chamber 231 and a lock element 232. The chamber 231 is adapted to hold the lock element 232 in an unlocking position and a locking position. The lock element 232 is axially displaceable and rotatable within the chamber 231 between the unlocking position and locking position.

The embedded locking structure 230 shown in FIG. 2(b) is an example embodiment of the embedded locking structure 230, where the lock element 232 is a pin with a protrusion bar 233. This embedded locking structure 230 is further shown in FIG. 3, where (a) shows a cross-section view of the embedded locking structure 230 when the lock element 232 is in an unlocking position 311, (b) shows a cross-section view of the embedded locking structure 230 when the lock element 232 is in a locking position 312, (c) shows a cross-section view of the embedded locking structure 230 from a certain angel to show the structure of the chamber 231, and (d) shows a top perspective view of the embedded locking structure 230.

The lock element 232 in this embodiment is a pin with a protrusion bar 233 and the chamber 231, as shown in FIG. 3(c), comprises a groove having a first surface 310 to hold the lock element 232 in the unlocking position 311 and a second surface 320 to hold the lock element 232 in the locking position 312. As shown in FIG. 3(d), the lock element 232 can be pushed along an axial direction indicated by arrow A1 and rotated in a direction indicted by arrow R to the locking position.

Figure 4:
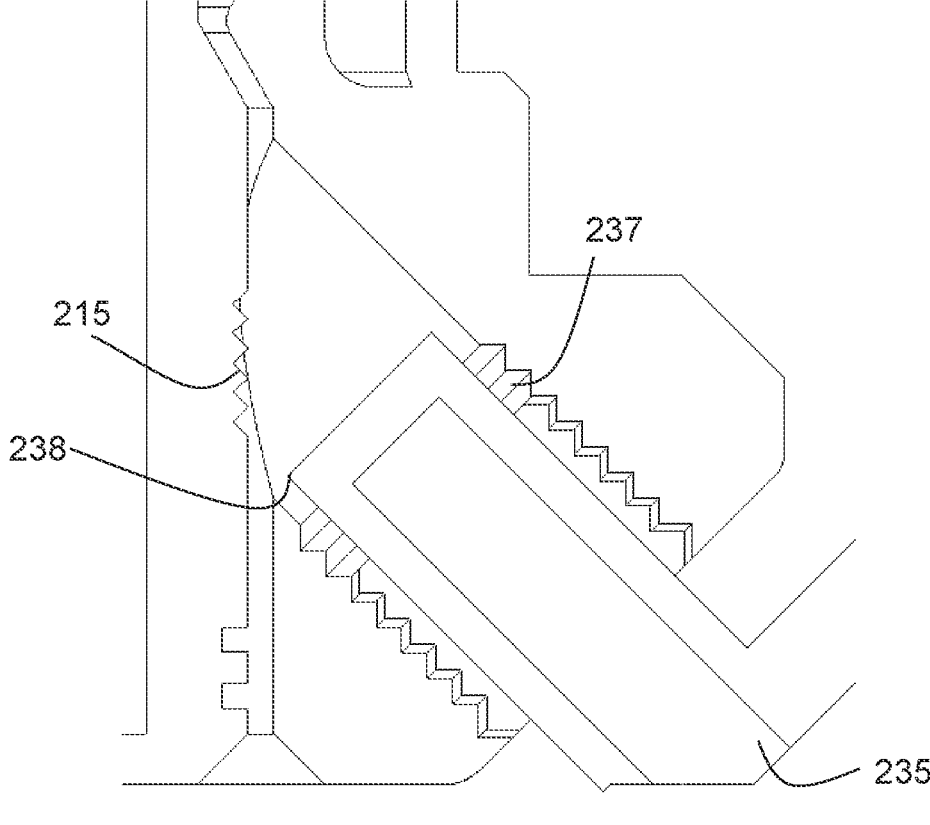
FIG. 4 shows another example of embedded locking structure according to embodiments herein.

FIG. 4 shows another example embodiment of the embedded locking structure 230, where the lock element 232 is a screw 235 and the chamber 231 comprises threads 237. The screw 235 can be rotated and axially translated to the locking position.

According to some embodiments herein, the bar 210 may comprise a jagged structure 215 adjacent to the first end 212 of the bar 210, as shown in FIG. 2(b), FIG. 3(a), (b) and FIG. 4. The jagged structure 215 is adapted to encounter the tip 236, 238 of the lock element 232, 235 when the lock element 232, 235 is in the locking position 312, as shown in FIG. 3(b).

According to some embodiments herein, the bar 210 may comprise a retaining structure 216 at the first portion 211 of the bar 210 for retaining the bar 210 in the housing 220 such that the bar 210 and housing 220 are non-detachable from each other. The retaining structure 216 may locate at any position within the first portion 211 of the bar 210, e.g. 1-3 cm from the first end 212 of the bar 210. The retaining structure 216 may be any shape, e.g. a protrusion around the bar 210 as shown in FIG. 2(*b*).

Figure 2:
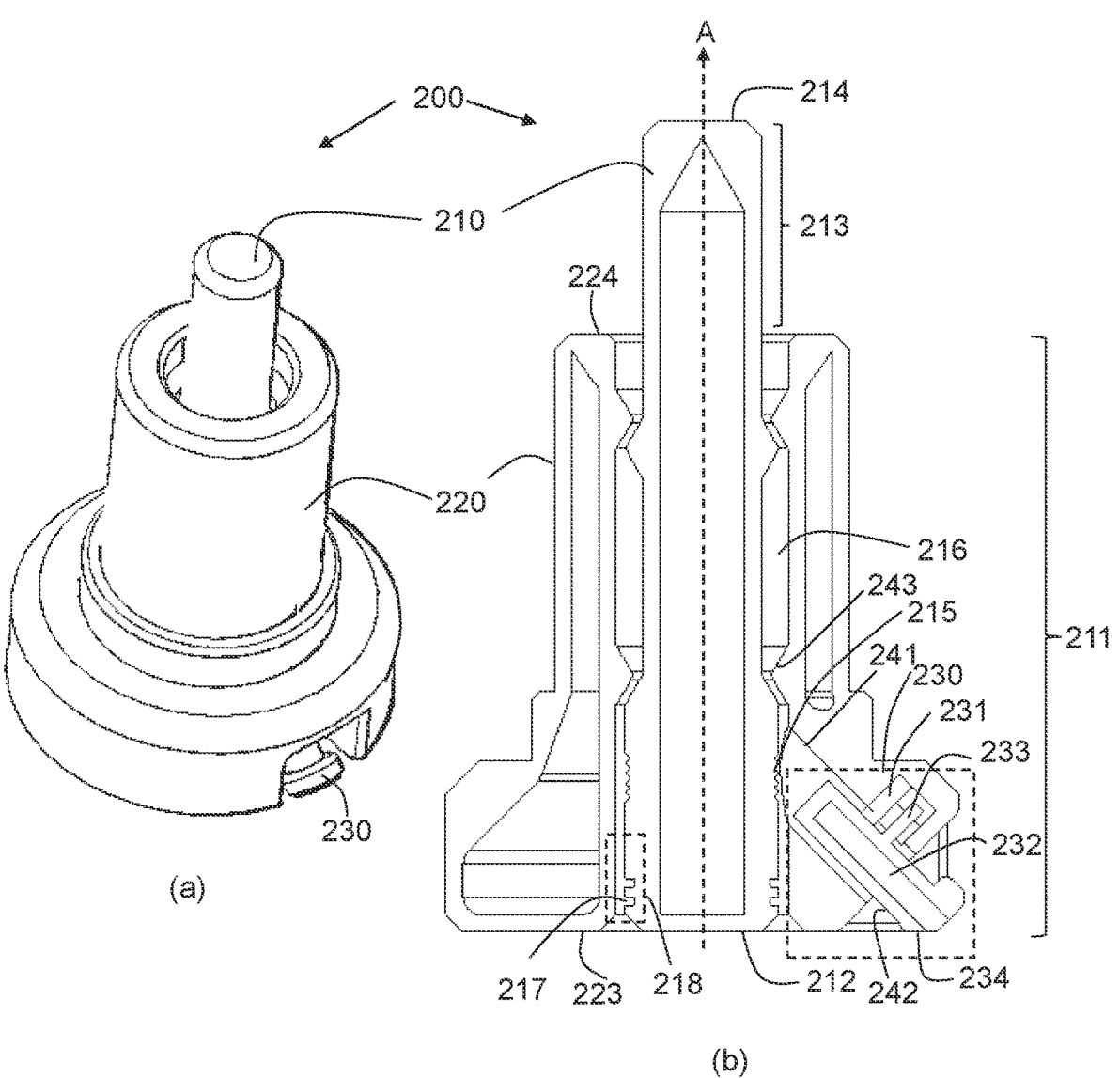
FIG. 2 shows a tool according to embodiments herein.
Figure 3:
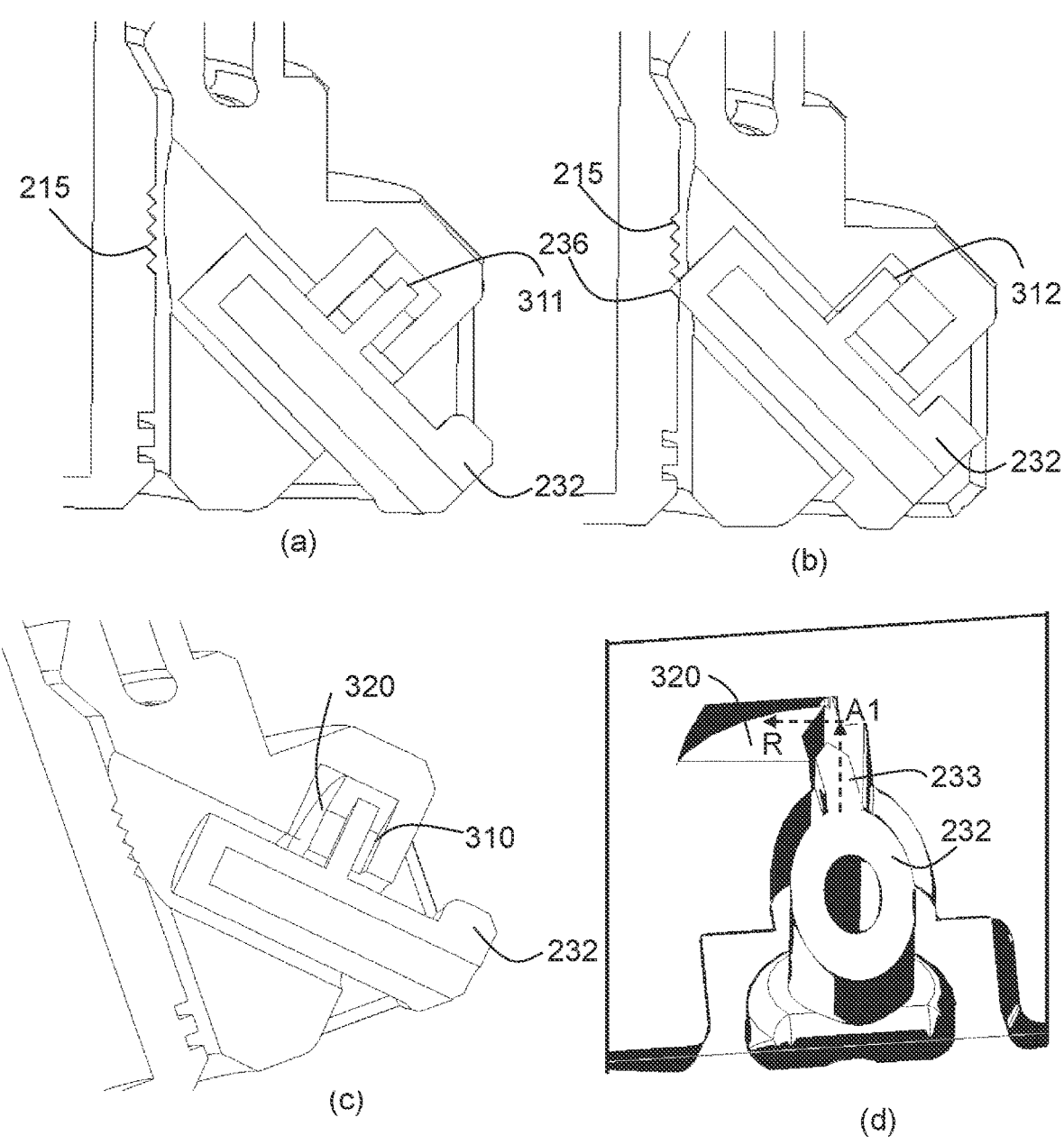
FIG. 3 shows an example of embedded locking structure according to embodiments herein.

According to some embodiments herein, the bar 210 may comprise two or more markers 217 at a position 218 of the first portion of the bar 210 spaced apart from the first end 212 of the bar 210, as shown in FIG. 2(*b*). The two or more markers 217 may be gaps. The two or more markers 217 is for indicating measured distance between two components.

According to some embodiments herein, to decrease the weight and material of the tool 200, any one or all of the bar 210, the housing 220 and the lock element 230 may have a hollow structure.

According to some embodiments herein, to increase the strength of the tool 200, any one or all of the bar 210, the housing 220 and the lock element 230 may comprise strengthening ribs.

The tool 200 is configured to be manufactured by 3D-printing as one unit during a single additive manufacturing process. The tool 200 may be made of stainless steel, tool steel or titanium alloy by 3D printing.

Figure 5:
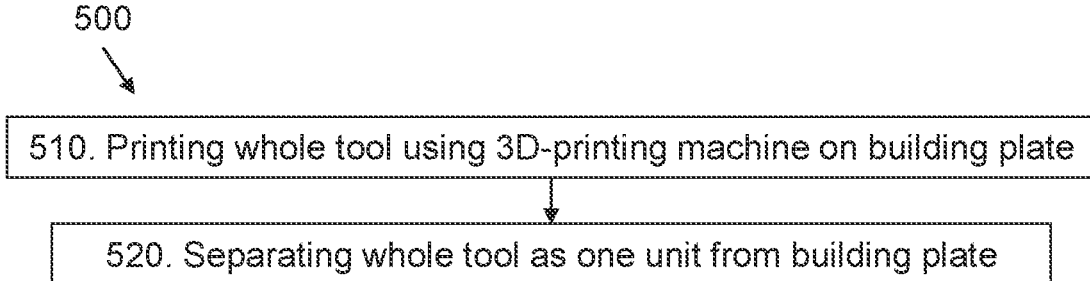
FIG. 5 is a flow chart shows a method for manufacturing a tool according to embodiments herein.

FIG. 5 shows a flow chart of a method 500 for manufacturing the tool 200. The method 500 comprises the following actions.

Action 510

Printing the whole tool 200 by using a 3D-printing machine on a building plate starting from the first end 212 of the bar 210, a first end 223 of the housing 220, a first end 234 of the embedded locking structure 230 and continuing up to the second end 214 of the bar 210. The bar 210, the housing 220 and the embedded locking structure 230 are 3D-printed as one unit during a single manufacturing process.

During the same single manufacturing process, the optional retaining structure 216 and jagged structure 215, the optional markers 217, the optional pin 232 with protrusion bar 233 and the chamber 231 with two surfaces or the optional chamber 231 with threads and the screw 235 are directly 3D-printed during the same single manufacturing process, such that the whole tool 200 is 3D-printed as one unit during the single manufacturing process.

As can be seen from FIG. 2(*b*), important face-down surfaces, e.g. surface 241 of the chamber 231, surface 242 of the lock element 232, surface 243 of the retaining structure 216 on the bar 210, etc., all are designed such that they can be printed layer by layer without extra support structures during 3D printing.

Action 520

Separating the whole tool 200 as one unit from the building plate. The tool 200 is then ready to use without any post processing and assembly process.

Figure 6:
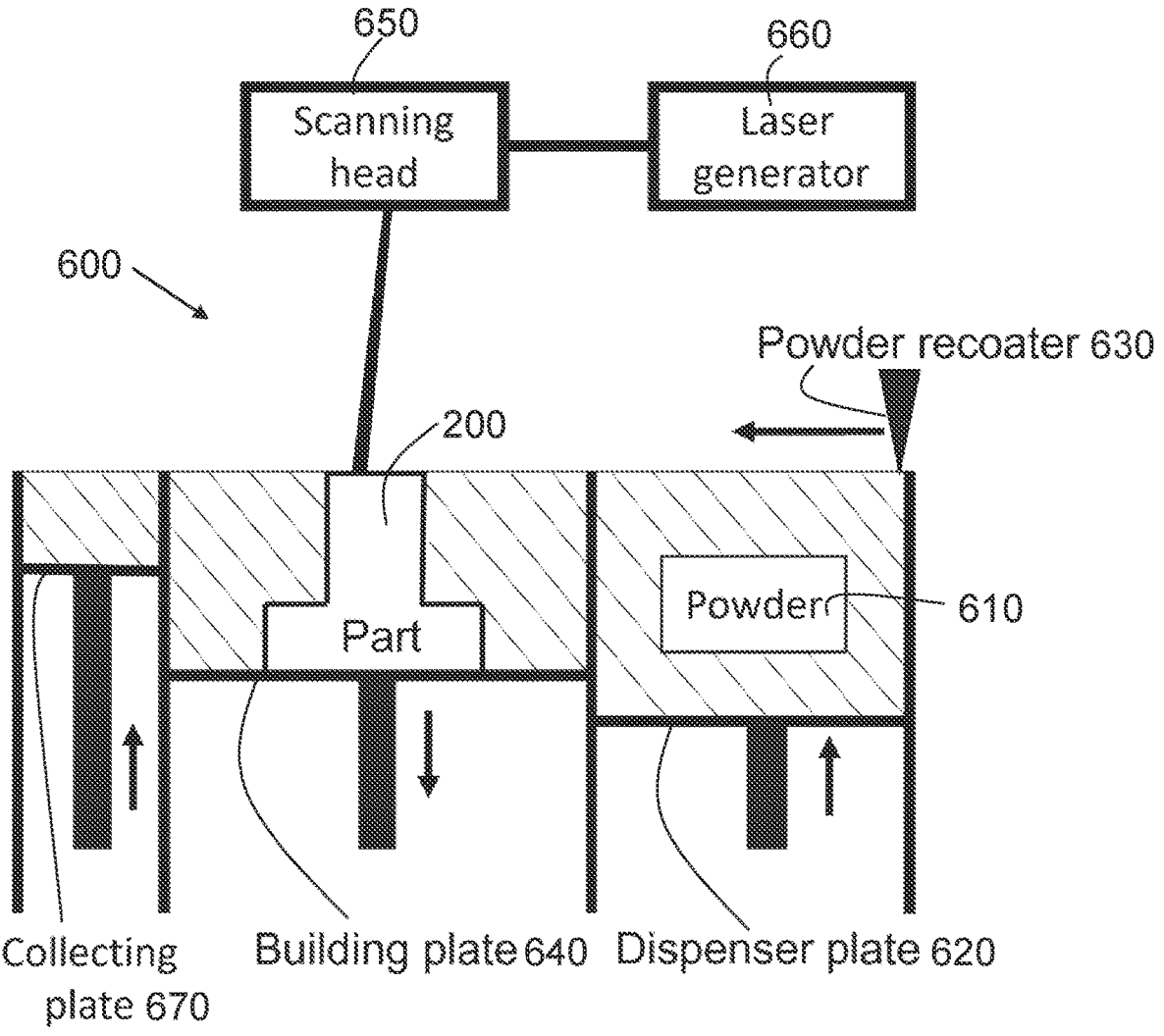
FIG. 6 is a simplified cross-section view of an example 3D printing machine.

FIG. 6 is a simplified cross-section view of an example 3D printing machine 600, which may be used to manufacture the tool 200 by Selective Laser Melting (SLM) process. During the SLM process, a product is formed by selectively melting successive layers of powder by the interaction of a laser beam. Upon irradiation, the powder material is heated and, if sufficient power is applied, melts and forms a liquid pool. Afterwards, the molten pool solidifies and cools down quickly, and the consolidated material starts to form the product. After the cross-section of a layer is scanned, the building platform is lowered by an amount equal to the layer thickness and a new layer of powder is deposited. This process is repeated until the product is completed.

This layer-by-layer process was first used to produce prototypes, but the trend is towards direct manufacture of components because of its ability to net-shape manufacture complex structures from a CAD model and a wide range of materials without the need of expensive tooling and machining so that the delay between design and manufacture is minimised.

As shown in FIG. 6, during the process, metal powder 610 in a dispenser plate 620 is heated close to its melting point and spread by a power recoater 630 on a building plate 640. A scanning head 650 connected to a laser generator 660 draws or scans a cross section of a part, e.g. the tool 200, into the powder material, i.e. the cross section of the first end 212 of the bar 210, the first end 223 of the housing 220 and the first end 234 of the embedded locking structure 230 are formed by the laser beam. After the cross-section of a layer is scanned, the building plate 640 is lowered corresponding to one layer thickness which is approximately 0.1 mm, after which the process is repeated until the 3D tool 100 is completed. A collecting plate 670 is used for collecting the rest of un-melted metal powder.

As the finishing is done together with the SLM, no additional finishing is required except from removing un-melted metal powder. This process produces objects with very good finish.

Another advantage of this process is that the powder is melted only locally by the laser and the rest of the powder can be recycled for further fabrication. The SLM may be used to selectively melt nickel-based superalloys, Ti-based alloys, Al-based alloys and Nb-based alloys to fabricate components and structures for automobile and aerospace application.

The usage of the tool 200 is similar to the original setting tool 10:

The tool 200 is unlocked when not used.

During operation, the tool 200 will be placed correctly e.g. sitting on a flywheel housing, to measure the distance between two components, i.e. the tooth of the camshaft toothed wheel and the timing gear cover.

Then the lock element 232 will be pushed and rotated to the locking position. The tip of the lock element 232 will encounter the jagged structure 215 and hold the position of the bar 210 in A-axis.

Then the tool 200 can be removed.

By reading how many gaps are visible at the end of the bar 210, it can be known how many shims should be added in the following maintenance step.

To summarize, advantages and improved performances of the tool 200 according to embodiments herein may include and not limited to the following:

The tool 200 is a single piece assembly-free tool manufactured by 3D printing with metal, e.g. stainless steel, tool steel or titanium alloy. By making the tool 200 assembly-free, the service maintenance time will be shortened and the maintainability of the tool is also improved.

The tool 200 is designed in a way that it can be 3D printed as one unit or one piece. The tool 200 can be directly used after printing without additional machining process. The structures and shapes of the tool 200 is configured in such a way that there will be no need for support structures during printing which minimizes the post processing and reduces the cost.

The tool 200 has an embedded locking function consists of a jagged feature and a lock element to lock the movement of the bar 210 in the axial direction. By the provision of the jagged structure and combined with the 'rotate-locking' pin to secure the position of the bar, the functionality, maintainability and the lifetime of the tool are expected to be improved The tool 200 has simplified manufacturing process which avoids manufacturing different parts, four parts of the original tool can be printed as one unit during a single 3D printing process. That is the tool 200 needs neither manufacturing different parts nor using different materials as the case of the original tool 10, which simplifies the manufacturing process.

The tool 200 has a light-weighted structure, i.e. hollow structure with or without strengthening ribs which lights the weight more than 48% of the original tool 10. The cost for 3D printing the tool 200 is reduced as smaller volume of metal will be used compared to the original tool 10.

It is to be understood that the present disclosure is not limited to the embodiments described above and illustrated in the drawings; rather, the skilled person will recognize that many changes and modifications may be made within the scope of the appended claims.

The invention claimed is:

1. An assembly-free tool for maintenance of an engine in a vehicle, the tool comprising:

a bar extending in an axial direction and having a first portion with a first end and a second portion with a second end; and a housing surrounding the first portion of the bar;

wherein the bar is axially translatable in relation to the housing; and wherein the housing comprises an embedded locking structure for holding the bar in a locking position such that the movement of the bar in the axial direction is stopped; and wherein the bar, the housing and the locking structure are retained as one unit such that they are non-detachable from each other.

2. The tool according to claim 1, wherein the embedded locking structure comprises a chamber and a lock element, wherein the chamber is adapted to hold the lock element in an unlocking position and a locking position, and the lock element is axially displaceable and rotatable within the chamber between the unlocking position and locking position.

3. The tool according to claim 2, wherein the bar comprises a jagged structure adjacent to the first end of the bar, wherein the jagged structure is adapted to encounter the tip of the lock element when the lock element is in the locking position.

4. The tool according to claim 3, wherein the lock element is a pin with a protrusion bar and the chamber comprises a groove having a first surface to hold the lock element in the unlocking position and a second surface to hold the lock element in the locking position.

5. The tool according to claim 3, wherein the lock element is a screw and the chamber comprises threads.

6. The tool according to claim 1, wherein the bar comprises two or more markers at a position of the first portion of the bar spaced apart from the first end of the bar.

7. The tool according to claim 6, wherein the two or more markers are gaps.

8. The tool according to claim 1, wherein the tool is configured to be manufactured by additive manufacturing with Selective Laser Melting process as one unit during a single additive manufacturing process.

9. The tool according to claim 1, wherein the tool is made of stainless steel, tool steel or titanium alloy.

10. The tool according to claim 1, wherein any one or all of the bar the housing and the lock element has a hollow structure.

11. The tool according to claim 1, wherein any one or all of the bar, the housing and the lock element comprises strengthening ribs.

12. The tool according to claim 1, wherein the bar comprises a retaining structure at the first portion of the bar for retaining the bar in the housing such that the bar and housing are non-detachable from each other.

13. A method for manufacturing the tool according to claim 1, the method comprising:

printing the whole tool by using an additive manufacturing machine with Selective Laser Melting process on a building plate starting from a first end of the bar, a first end of the housing, a first end of the embedded locking structure and continuing up to the second end of the bar, wherein the bar, the housing and the embedded locking structure are additive manufactured as one unit during a single manufacturing process; and separating the whole tool as one unit from the building plate.

14. The method according to claim 13, wherein the optional retaining structure and jagged structure, the optional markers, the embedded locking structure with pin and protrusion bar and the chamber with two surfaces, or the embedded locking structure with the chamber with threads and the screw are directly additive manufactured during the same single manufacturing process, such that the whole tool is additive manufactured as one unit during the single manufacturing process.

\* \* \* \* \*